United States Patent [19]

Hideo

[11] Patent Number: 4,611,522

[45] Date of Patent: Sep. 16, 1986

[54] TONE WAVE SYNTHESIZING APPARATUS

[75] Inventor: Suzuki Hideo, Hamamatsu, Japan

[73] Assignee: Nippon Gakki Seizo Kabushiki Kaisha, Hammatsu, Japan

[21] Appl. No.: 720,174

[22] Filed: Apr. 5, 1985

[30] Foreign Application Priority Data

Apr. 10, 1984 [JP] Japan ................................ 59-71549
Oct. 29, 1984 [JP] Japan ................................ 59-228685

[51] Int. Cl.[4] .......................... G10H 1/00; G06F 1/02
[52] U.S. Cl. ...................................... 84/1.01; 84/1.19
[58] Field of Search ........................ 84/1.01, 1.19, 1.2, 84/1.22, 1.23

[56] References Cited

U.S. PATENT DOCUMENTS

| | | | |
|---|---|---|---|
| 4,471,681 | 9/1984 | Nishimoto | 84/1.01 |
| 4,483,229 | 11/1984 | Tsukamoto et al. | 84/1.01 |
| 4,498,364 | 2/1985 | Ezawa | 84/1.01 |
| 4,536,853 | 8/1985 | Kawamoto et al. | 84/1.01 |
| 4,539,884 | 9/1985 | Aoki | 84/1.01 |

FOREIGN PATENT DOCUMENTS 121313 10/1977 Japan .

*Primary Examiner*—Russell E. Adams
*Attorney, Agent, or Firm*—Spensley Horn Jubas & Lubitz

[57] ABSTRACT

A tone wave synthesizing apparatus comprises a phase address generator; a time frame generator; an elementary wave generator; an incremental wave generator; and an adder. The phase address generator generates a phase address signal which designates phase addresses for phase angles of a waveform to be produced progressively and repetitively. The time frame generator generates a time frame signal which sequentially designates a series of time frames one after another. The elementary wave generator repeatedly generates, for each designated time frame, a period of elementary tone wave in the form of a series of wave sample values in accordance with the phase address signal, which elementary tone wave represents a tone wave at a beginning of the designated time frame. The incremental wave generator generates progressively changing incremental waves each in the form of a series of wave sample values in accordance with the phase address signal, which progressively changing incremental waves exhibit successive changes of waveform from one period to another by an amount predetermined for the designated time frame. The adder adds, in each time frame of the successive time frames, the elementary tone wave and the progressively changing incremental waves from one period to another. Thus a tone wave which changes its form with the lapse of time is synthesized by means of a small sized waveform generators.

5 Claims, 13 Drawing Figures

| FN | X (0 ~ 31) | |
|---|---|---|
| 0F |  | $F_0$ (ELEMENTARY TONE WAVE FOR FRAME 0F) — $F_R$ (BASIC WAVEFORM) |
| 1F |  | $F_1$ (ELEMENTARY TONE WAVE FOR FRAME 1F) — $F_R$ (BASIC WAVEFORM) |
| 2F | 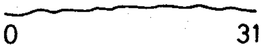 | $F_2$ (ELEMENTARY TONE WAVE FOR FRAME 2F) — $F_R$ (BASIC WAVEFORM) |
| ⋮ | | |
| NF |  | $F_N$ (ELEMENTARY TONE WAVE FOR FRAME NF) — $F_R$ (BASIC WAVEFORM) |
| (N+1)F |  | $F_{N+1}$ (TONE WAVE AT END OF FRAME (N+1)F) — $F_R$ (BASIC WAVEFORM) |
FIG. 4

| FN | X (0 ~ 31) | WAVEFORM CHANGE (INCREMENTAL WAVEFORM DATA) |
| --- | --- | --- |
| 0F | 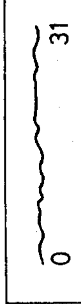 | {$F_1$ (ELEMENTARY TONE WAVE FOR FRAME 1F) — $F_0$ (ELEMENTARY TONE WAVE FOR FRAME 0F)} / $TCV_0$ |
| 1F |  | {$F_2$ (ELEMENTARY TONE WAVE FOR FRAME 2F) — $F_1$ (ELEMENTARY TONE WAVE FOR FRAME 1F)} / $TCV_1$ |
| 2F |  | {$F_3$ (ELEMENTARY TONE WAVE FOR FRAME 3F) — $F_2$ (ELEMENTARY TONE WAVE FOR FRAME 2F)} / $TCV_2$ |
| ------ | | |
| (N-1)F | 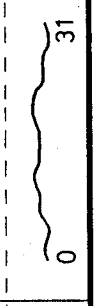 | {$F_N$ (ELEMENTARY TONE WAVE FOR FRAME NF) — $F_{N-1}$ (ELEMENTARY TONE WAVE FOR FRAME (N-1)F)} / $TCV_{N-1}$ |

FIG. 11

TONE WAVE SYNTHESIZING APPARATUS

BACKGROUND OF THE INVENTION (a) Field of the Invention

This invention relates to a tone wave synthesizing apparatus and more particularly to a tone wave synthesizing apparatus for synthesizing a tone wave by aligning wave sample values, wherein the waveform varies with the lapse of time.

(b) Description of the Prior Art

The tone wave synthesizing apparatuses of a type in which the waveform varies with the lapse of time are used as tone wave synthesizing apparatuses of, for example, electronic musical instruments mostly for synthesizing tone waves giving delicate feeling of natural musical instrument sounds. Therefore, there has already been suggested a tone wave synthesizing apparatus wherein waveform data for all of a plurality of sampling points through the whole length of a tone wave from the beginning to the end are stored previously in a waveform memory so that, when the waveform data are read out progressively, a tone wave will be formed (Japanese patent laid open No. 121313/1977).

According to this apparatus, waveform data to be stored in the waveform memory are determined to be waveform data obtained by sampling the natural musical instrument sounds and therefore, the same tone waves which substantially correspond to the natural musical instrument sounds can be synthesized. However, in this apparatus, the amount of the waveform data to be stored in the waveform memory will become so large that the capacity of the waveform memory will become large. Thus this apparatus has a problem in reducing the size and cost.

SUMMARY OF THE INVENTION

An object of the present invention is to eliminate the above described disadvantages and to provide a tone wave synthesizing apparatus with small sized waveform memories yet synthesizing tone waves of a high quality.

This object is achieved by a tone wave synthesizing apparatus which comprises: phase addressing means generating a phase address signal which designates phase addresses progressively and repetitively; time frame designating means sequentially designating, for each tone wave to be synthesizied, a series of time frame one after another; elementary wave generating means repeatedly generating, for each designated time frame, a period of elementary tone wave in the form of a series of wave sample values in accordance with said phase address signal, said elementary tone wave representing a tone wave at a biginning of the designated time frame; incremental wave generating means generating progressively changing incremental waves each in the form of a series of wave sample values in accordance with said phase address signal, said progressively changing incremental waves exibiting successive changes of waveform from one period to another of said period by an amount predetermined for each designated time frame; and wave combining means combining, in each time frame of said successive time frames, said elementary tone wave and said progressively changing incremental waves.

According to the present invention, the tone wave to be synthesized is divided into a purality of time frames, an elementary waveform is provided for each time frame and an incremental waveform is added progressively to the elementary waveform to synthesize the tone wave, therefore the waveform memories can be made compact in the capacity and thus a tone wave synthesizing apparatus can be constructed at a low cost and can produce tone waves exhibiting complicatedly changing waveform with the lapse of time.

This and other objects of the present invention will become more apparent during the course of the following detailed description and appended claims.

BRIEF DESCRIPTION OF THE DRAWINGS

FIG. 4 is a chart showing the contents of a difference waveform memory in the embodiment of FIG. 3.

FIG. 11 is a chart showing the contents of an incremental waveform memory in the embodiment of FIG. 10.

DESCRIPTION OF THE PREFERRED EMBODIMENT

The present invention shall be explained in detail in the following on the basis of the embodiments with reference to the drawings.

First of all, the basic principle of the present invention shall be explained in the following.

As shown at (A) in FIG. 1, the whole length of a tone wave MW from the beginning to the end is divided into a determined number of spans (these divided spans shall be called frames hereinafter). When it comes to the change of the waveform, it can be observed that the tone wave does not exhibit big and complicated changes but relatively small and monotonous changes within one frame. Therefore, in the present invention, a predetermined elementary tone wave [for example, a waveform at the beginning of each frame (called a frame waveform hereinafter)] is prepared for each frame, and an interpolating computation is carried out between each two adjacent frame waveforms to form a progressively changing tone wave in each frame.

That is to say, for example, with respect to an i th (i=0, 1, . . . Q, . . . N) frame iF of the tone wave MW in FIG. 1, a plurality of incrementing waveforms $F_i'$, $F_i''$, . . . will be formed, as shown in FIG. 2, by an interpolating computation between the frame waveforms $F_i$ and $F_{(i+1)}$, so that the frame waveform $F_i$ of this frame iF will shift progressively to the frame waveform $F_{(i+1)}$ of the next frame (i+1)F. This interpolating computation is performed, for example, by computing the difference $(F_{(i+1)}-F_i)$ between the frame waveforms $F_i$ and $F_{(i+1)}$ (needless to say, this difference is computed at respectively corresponding phase points), weighting this difference (frame increment) waveform $(F_{(i+1)}-F_i)$ with a progressive change to make the incremental waves of this invention, and adding it to the frame waveform $F_i$.

Figure 1:
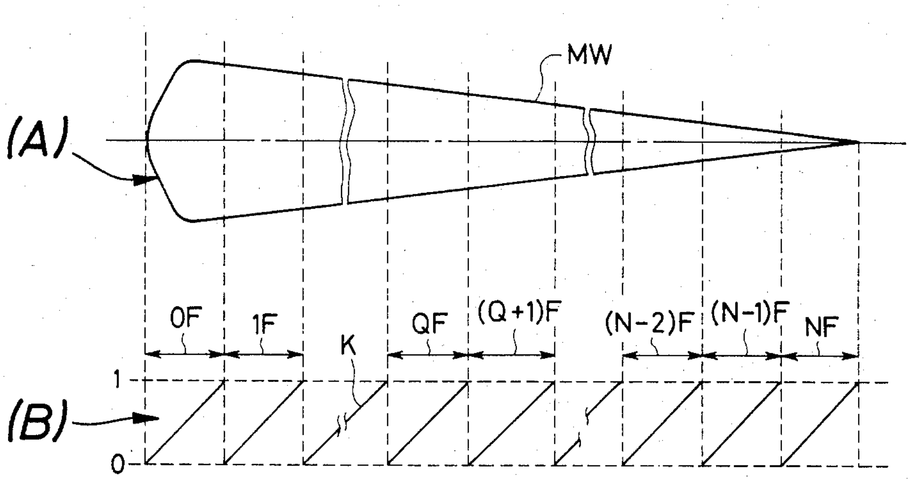
FIG. 1 is a wave chart showing the overall envelope of a tone wave to be synthesized.
Figure 2:
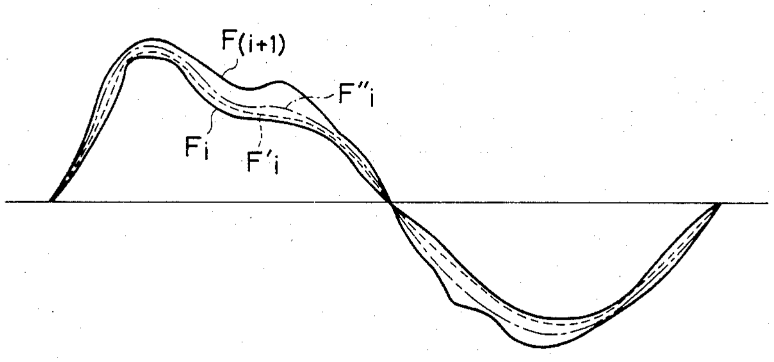
FIG. 2 is a wave chart showing changes of the waveform in a time frame.

As an example, there is computed a formula $$F_i+K\cdot(F_{(i+1)}-F_i) \quad (1)$$

wherein the above mentioned incremental waveform $(F_{(i+1)}-F_i)$ is multiplied by a weighting coefficient K which varies progressively from 0 to 1 within each frame of 0F, 1F, . . . , NF shown at (B) in FIG. 1 and is then added to the frame waveform $F_i$. In this formula (1), when the coefficient K is varied progressively, for example, as 0, 0.1, . . . 1, there will be obtained a tone wave which exhibits a progressive change from the frame waveform $F_i$ to the frame waveform $F_{(i+1)}$. The same is true in other frames.

Other than the formula (1), following formula (2) or (3) can be also used for the interpolating computation.

$$F_1-K\cdot(F_i-F_{(i+1)}) \quad (2)$$

$$F_{(i+1)}-K'\cdot(F_{(i+1)}-F_i) \quad (3)$$

where, in the formula (3), the coefficient K' is a weighting coefficient which varies progressively from 1 to 0 within each frame.

Thus, as the above described interpolating computation (based on the formula (1), (2) or (3)) is performed for each frame to synthesize a tone wave, only the respective frame waveform $F_0$, $F_1$, . . . $F_Q$, $F_{(Q+1)}$ . . . $F_N$ should be stored in the waveform memory previously. The difference (frame increment) waveforms $F_1-F_{0'}$ . . . $F_{(Q+1)}-F_{Q'}$ . . . $F_N-F_{(N-1)}$ or $F_0-F_1$, . . . $F_Q-F_{(Q+1)}$, . . . $F_{(N-1)}-F_N$ can be obtained by the subtraction of the adjacent frame waveforms from each other and therefore need not be separately prepared. As compared with storing the tone wave MW per se as a whole as in the conventional practice, the waveform memory can be made smaller in the capacity.

The present invention is made to synthesize a tone wave by using the above basic principle and is further constructed as follows to make the capacity of the waveform memory smaller. That is to say, in the first embodiment of the present invention shown in FIG. 3, a common appropriate basic waveform $F_R$ is set for all of the frame waveforms $F_i$ (where i=0, 1, . . . N), and the difference waveforms $F_1-F_R$ or $F_R-F_i$ between the respective frame waveforms $F_i$ and this basic waveform $F_R$ are previously computed and stored in the waveform memory. As the difference waveform $F_i-F_R$ can be trivial and can be expressed by a small number of bits, the waveform memory can be made smaller in the capacity than in the case of storing the frame waveforms $F_i$ per se in the waveform memory.

Thus, the respective difference waveforms $F_i-F_R$ stored in the waveform memory are read out with the progress of the frame and are respectively added to the above mentioned basic waveform $F_R$ to generate the respective frame waveforms $F_i$. The difference waveform between the adjacent two frame waveforms is formed on the basis of the adjacent two difference waveforms $F_i-F_R$ between the above mentioned frame waveform $F_i$ and basic waveform $F_R$.

That is to say, in the first embodiment, the frame waveform $F_i$ is obtained by the addition (or subtraction) of the basic waveform $F_R$ and the difference waveform $F_i-F_R$ (or $F_R-F_i$) and is expressed as $$F_i=F_R+(F_i-F_R) \quad (4)$$

or $$F_i=F_R-(F_R-F_i) \quad (5).$$

Therefore, for example, the difference waveform $F_{(i+1)}-F_i$ of the adjacent two frame waveforms $F_{(i+1)}$ and $F_i$ is expressed by $$\begin{aligned} F_{(i+1)}-F_1 &= \{F_R+(F_{(i+1)}-F_R)\}-\{F_R+(F_i-F_R)\} \quad (6) \\ &= (F_{(i+1)}-F_R)-(F_i-F_R) \end{aligned}$$

and is, as a result, equal to the difference between the two difference waveforms $F_{(i+1)}-F_R$ and $F_i-F_R$ relating to the adjacent two frame waveforms $F_{(i+1)}$ and $F_i$.

This difference waveform $(F_{(i+1)}-F_R)-(F_i-F_R)$ of the adjacent two frame waveforms is obtained by simultaneously reading the difference waveforms $F_i-F_R$ and $F_{(i+1)}-F_R$ out of the above mentioned waveform memory and subtracting one from the other. In this case, as the difference waveforms $F_i-F_R$ and $F_{(i+1)}-F_R$ are of few bits, the subtracter for the above mentioned subtraction may be also of few bits. Also, this difference waveform $(F_{(i+1)}-F_R)-(F_i-F_R)$ of the adjacent frame waveforms is of considerably few bits and therefore can be stored directly in the waveform memory. Further, if, instead of this difference waveform $(F_{(i+1)}-F_R)-(F_i-F_R)$, an incremental waveform which is 1/A time as small as said difference waveform can be stored in the waveform memory, and this incremental waveform $$1/A\ \{(F_{(i+1)}-F_R)-(F_i-F_R)\}$$

is repetitively accumulated with the progress of time within each frame, and the same result as the above described weighted difference waveform $K\cdot(F_{(i+1)}-F_i)$ will be obtained.

The above described basic waveform $F_R$ can be freely set, but preferably should be set so that the difference waveform $F_i-F_R$ (or $F_R-F_i$) relating to each frame may be as small as possible. In such case, exactly the same waveform as of any one frame waveform $F_i$ (for example, in the first frame waveform $F_0$) may be set as the basic waveform $F_R$.

Also, in the second embodiment of the present invention, the frame waveform $F_i$ and the weighted difference waveforms $K\cdot(F_{(i+1)}-F_1)$ in the above described formula (1) (or formula (2) or (3)), are formed not separately but simultaneously. That is to say, in the formula (1), if the coefficient K becomes 1, the obtained tone wave will be the frame waveform $F_{(i+1)}$ of the next frame (i+1)F. Therefore, the tone wave when the coefficient K is 1 is used as the frame waveform $F_{(i+1)}$ of the next frame (i+1)F. That is to say, by the computation of the formula (1), the interpolating waveform between the respective frame waveforms is made and each frame waveform is made.

To this end, in the second embodiment, the difference waveform $F_{(i+1)}-F_i$ (or $F_1-F_{(i+1)}$) between the frame waveform $F_i$ of said frame and the frame waveform $F_{(i+1)}$ of the next frame is computed for each frame, is stored in the waveform memory, is read out progressively with the progress of the frame, is weighted as described above and is then added to the frame wavefrom $F_i$ of the now designated frame. In this case, the wave form obtained last in the frame iF is temporarily stored by a suitable means so as to be used as the frame waveform $F_{(i+1)}$ of the next frame (i+1)F. Since the frame wavefrom $F_0$ of the zeroth frame 0F can not be formed as described above, it is generated as an initial wave by a suitable means (for example, by using a separate waveform memory).

In this second embodiment, instead of the difference waveform $(F_{(i+1)}-F_i)$ itself, an incremental waveform which is 1/A time as small as this difference waveform $(F_{(i+1)}-F_i)$, that is, $$1/A\ (F_{(i+1)}-F_i)$$

is stored in the waveform memory and is repetitively accumulated with the progress of time in the frame so that the weighted difference waveform $K\cdot(F_{(i+1)}-F_i)$ may be substantially obtained to make the incremental waves.

Also in this second embodiment, as only the difference waveforms (frame increments) are stored in the waveform memory, the waveform memory can be made small in the capacity.

The interpolating computation between the frame waveforms may be made as follows: in the interpolating computation, an initial wave representing a tone wave (which shall be called an elementary tone wave) of a determined period (for example, one cycle) to be generated at the time of beginning to synthesize the tone wave is generated, a waveform change (wave increment) is stored previously for each frame and the waveform change is computed by successively processing the preceding wave form to form a succeeding waveform. Here, as the value of the waveform change in each frame varies with the progress of time, the generated tone wave changes practically continuously. Thus, for example, as shown in FIG. 11, the waveform change data $\Delta D_i$ of the ith frame iF are the value of the difference $(F_{(i+1)}-F_i)$ between the frame waveforms $F_i$ and $F_{(i+1)}$ divided by the repetition number TCVi of the interpolating computation in the ith frame iF;

$$\Delta D_i = \frac{F_{(i+1)} - F_i}{TCVi}. \quad (7)$$

Therefore, the tone wave synthesized in this frame changes its shape step by step with the waveform change data $\Delta D_i$ as a unit from the frame waveform $F_i$ toward the frame waveform $F_{(i+1)}$. However, these waveform change data $\Delta D_i$ are selected to be of a value so small as compared with the difference between the frame waveforms $F_i$ and $F_{(i+1)}$ that the change of the generated tone wave is practically continuous.

Thus, the waveform data to be prepared are only the initial waveform data of one waveform and waveform change data (incremental waveform data) of each frame, the waveform change data can be selected to be of very small values and therefore the waveform memory can be easily made small in the capacity.

In the embodiment of this invention, the first method of disignating the frame, is that the number of tone wave cycles for each frame is predetermined and if the tone wave periods are repeated as many times as this number, then the next frame is designated successively. Also, the second method is that, the time length of each frame is predetermined and, after the lapse of this time, the next frame is designated successively.

The embodiments of the tone wave synthesizing apparatus constructed accroding to the above described basic principle of the present invention shall be explained in the following with reference to the embodiments.

Embodiment 1

Figure 3:
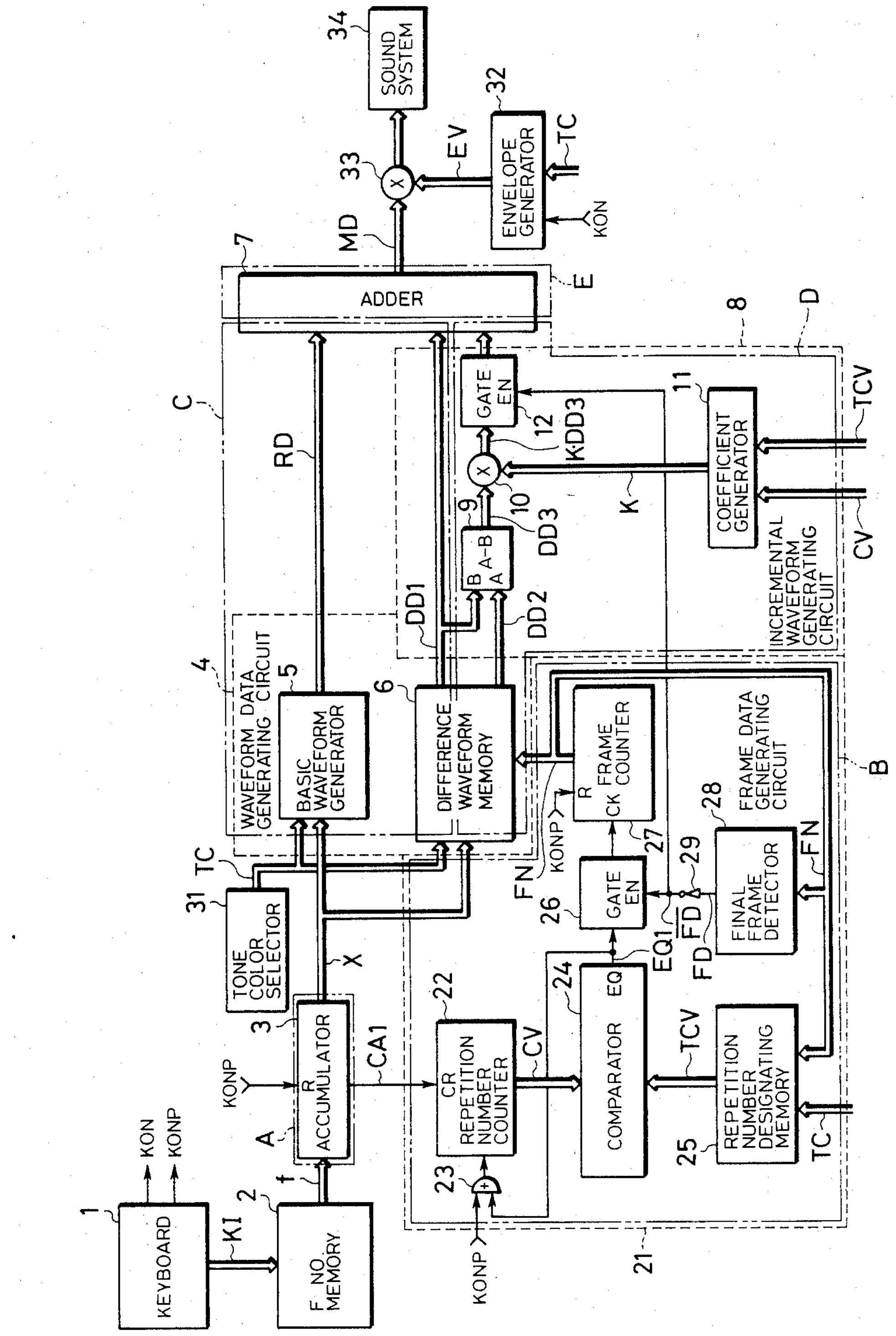
FIG. 3 is a block diagram showing an embodiment of the tone wave synthesizing apparatus according to the present invention.

FIG. 3 shows an embodiment of the present invention as applied to a monophonic electronic musical instrument. The keyboard 1 having a single key preferentially selecting function supplied to the F number memory 2 the key information KI relating to one key most preferential among simultaneously depressed keys and also supplies the key-on signal KON (a signal rising to a logic "1" while the key is depressed) and the key-on pulse signal KONP (a pulse generated at the moment the key-on signal KON rises to logic "1").

The F number memory 2 generates numerical data (called F numbers) corresponding to the pitch of the key depressed according to the key information KI. In this memory are stored digital numerical value data for respective pitches in such a way that the numerical value corresponding to the highest tone be set as 1.000 (decimal number) so that the respectibe pitches from the lowest to the highest that can be represented as digital numerical value data of decimal fraction values.

The F number signal f thus supplied from the F number memory is inputted to the accumulator 3, which constitutes a phase addressing means A, is reset by the key-on pulse KONP, then accumulates the value of the F number signal at a predetermined speed and supplies the integer part of the thus accumulated value as a phase address signal X. Thus, the higher the pitch, the shorter the period in which the contents of the phase address signal X change.

In the embodiment, the phase address signal X is a digital data of 5 bits changing periodically from "00000" to "11111". Thus, during the progress in one period of the phase signal X, 32 sampling points, that is, the 0th to 31st sampling points can be addressed at a speed corresponding to the pitch of the depressed key.

The repetition number counter 22 of the frame data generator 21 (time frame designating means B) is a counter operated to count by the carry signal CA1 generated in the accumulator 3, and counts "1" up whenever the phase signal X has addressed every 32 sampling points and supplies the counted contents as computation sequence data CV.

The computation sequence data CV of this repetition number counter 22 are inputted to the comparator 24 and are compared with the repetition number data TCV obtained at the output end of the repetition number designating memory 25 and, when the computation sequence data CV coincide with the repetition number data TCV, will supply the coincidence detection signal EQ1 to the count input end of the frame counter 27 through the gate 26 and feed said signal EQ1 back to the reset input end of the repetition number counter 22 through an OR circuit 23. The key-on pulse signal KONP is further inputted to the OR circuit 23.

The repetition number designating memory 25 stores corresponding to the respective tone color the repetition number data TCV representing the respective numbers of tone wave cycles to be repeated in the respective frames 0F to NF, and reads out the repetition number data TCV for the frame designated by the tone color selecting signal TC and the frame designating signal FN supplied from the frame counter 27 to supply to the comparator 24. Therefore, when the repetition number designated by the repetition number data TCV from the repetition number designating memory 25 for each frame and the contents of the count output CV of the repetition number counter 22 coincide with each other (that is, whenever each frame ends), the comparator 24 will generate a coincidence detection signal EQ1, reset the repetition number counter 22 and make the frame counter 28 to count up by "1".

The count contents of this frame counter 27 since being reset by the key-on pulse KONP are inputted to the difference waveform memory 6 as a frame designating signal FN.

The frame designating signal FN of the frame counter 27 is inputted to the final frame detector 28. The final frame detector 28 will supply a final frame detection output FD rising to the logic "1" when the frame designating signal FN become N+1 and this final frame detection output FD will be inputted as an inversion output $\overline{FD}$ to the enable terminal of the gate 26 through the inverter 29 and will be inputted to the enable terminal of the gate 12. Therefore, when the final frame NF ends, the gate 26 is closed, and thus the counting operation of the frame counter 27 will be stopped so that the frame designating signal FN will not change.

The phase signal X supplied from the accumulator 3 is given as an address signal to the waveform data generating circuit 4. The waveform data generating circuit 4 has the basic waveform generator 5 and the difference waveform memory 6. The basic waveform generator 5 includes a waveform memory storing the sample values at 32 sampling points of the determined basic waveform $F_R$ as basic waveform data RD. These basic waveform data RD at the 32 sampling points are read out successively by the phase address signal X and are supplied to the adder 7.

As shown in FIG. 4, the difference waveform data representing the difference obtained by subtracting the basic waveform $F_R$ from the elementary tone wave (beginning waveform) of each of the frames 0F to NF are stored in the incremental waveform memory 6.

That is to say, as shown in the column of "0F" in FIG. 4, the difference waveform data on the 0th frame 0F are data representing the difference obtained by subtracting the basic waveform $F_R$ from the elementary tone wave for the frame 0F. Also, as shown in the column of "1F" in FIG. 4, the difference waveform data of the first frame 1F are data representing the difference obtained by subtracting the basic waveform $F_R$ from the elementary tone wave for the frame 1F. The difference waveform data for the other frames 2F to NF are data representing the defference obtained by subtracting the basic waveform $F_R$ from the elementary tone wave for each of the frames.

In the present invention, as described above, the tone waves in each of the frames 0F to NF are formed by the interpolating computation using the next frame elementary wave as a target value. However, in such case, as no next frame exists for the final frame NF, the interpolating computation for the tone wave formation can not be carried out in the final frame NF. Therefore, in this embodiment, in the final frame NF, the interpolating computation is made with the final waveform for the frame NF, for convenience sake, as the elementary wave of the next frame (N+1)F and, in response to it, the data representing the difference obtained by subtracting the basic waveform $F_R$ from the final waveform of the final frame NF are stored in the difference waveform memory 6 as the difference waveform data of the frame (N+1)F.

In this embodiment, the tone wave data stored in the difference waveform memory 6 are used as determined on the basis of the waveform corrected to be of a constant amplitude from the first to the last by normalizing the tone wave MW in FIG. 1(A). However, in some case, the data determined directly from the tone wave MW not normalized may be used.

In the difference waveform memory, the difference waveform data (data at 32 sampling points) relating to the frame designated by the frame designating signal FN from the frame counter 27 are read out progressively according to the phase address signal X and are supplied as the first difference waveform data DD1 and, at the same time, the difference waveform data relating to the next frame of the frame designated by the frame designating signal FN are read out progressively according to the phase address signal X and are supplied as the second difference waveform data DD2.

These first difference waveform data DD1 are given directly to the adder 7 and are given as a subtraction input to the subtracter 9. The second difference waveform data DD2 are given as an addition input to this subtracter 9. Thus, the subtraction data DD3 obtained by subtracting the first difference waveform data DD1 from the second difference waveform data DD2 are generated at its output end and are given to the multiplier 10. The subtraction data DD3 thus obtained from the subtracter 9 have contents obtained by subtracting the waveform data of the beginning waveform (frame waveform $F_i$) in the present frame iF from the waveform data of the beginning waveform in the (i+1)th frame (i+1)F next to the ith frame iF now being interpolatingly computed. This means that the formula (6) has been computed.

The incremental waveform generating circuit 8 has the coefficient generator 11, which supplies the above described weighting coefficient K to the multiplier 10 and multiplies K by the subtraction data DD3, and the output K·DD3 resulting from the mutiplication is given to the adder 7 through the gate 12. The thus obtained multiplication output K·DD3 has the contents corresponding to the computation result of the second term in the formula (1).

The coefficient generator 11 receives the repetition number data TCV representing the repetition number of the elementary tone wave within each frame and the computation sequence data CV representing the elementary tone wave period now being interpolatingly computed within said frame and supplies the coefficient K represented by the formula (8)

$$K = CV \div TCV \quad (8)$$

Here, the tone wave period number (repetition number of tone wave) contained in the 0th frame 0F at the time of beginning the tone wave to the final frame NF at the time of ending the tone wave has any number in each frame and is selected previously to be such tone wave period number as simply increases or reduces the tone wave changes in each frame.

Figure 5:
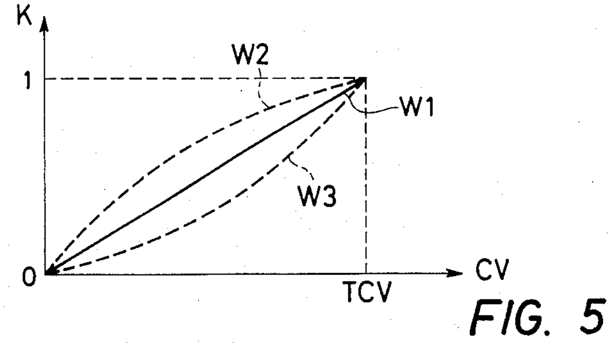
FIG. 5 is a graph showing operation curves of a coefficient generator in the embodiment of FIG. 3.

On the other hand, the computation sequence data CV increase one by one as the interpolating computation within each frame is carried out progressively from the first tone wave period so that, as indicated by the reference symbol W1 in FIG. 5, the contents of the coefficient signal K may increase, for example, linearly from 0 to 1 (decimal). As indicated by the reference symbols W2 and W3, the coefficient signal K may be so selected as to vary as a curve.

The waveform data corresponding respectively to the kinds of tone colors of tones which can be sounded are stored in the basic waveform generator 5 and the difference waveform memory 6 and the memory area of the waveform data memories is designated by the tone color selecting signal TC of the tone color selector 31 so that the waveform data of a determined tone color can be read out. The tone color selecting signal TC is given also to the repetition number designating memory 25 so that the tone wave period number contained in each frame can be changed in response to the tone color.

The addition output of the adder 7 is supplied to the sound system 34 through the multiplier 33 to which the envelope signal EV of the envelope generator 32 is supplied as the tone wave data MD and is converted to a tone.

The key-on signal KON and tone color selecting signal TC are given to the envelope generator 32 so that the envelope signal EV of the waveform corresponding to the selected tone color may be generated in response to the generation of the key-on signal KON.

In FIG. 3, the reference symbol C represents an elemental wave generating means, D represents an incremental wave generating means and E represents wave combing means.

In FIG. 3, when the key is operated, the key information KI, key-on signal KON and key-on pulse signal KONP of said key will be generated from the keyboard 1 and the accumulator 3, repetition number counter 22 and frame counter 27 will be simultaneously reset to begin a new counting operation.

In this state, the accumulator 3 will supply the phase address signal X changing progressively at a speed corresponding to the pitch of the depressed key so that the basic waveform data RD relating to the respective 0th to 31st sampling points of the basic waveform $F_R$ will be supplied from the basic waveform generator 5 progressively and repetitively according to the phase address signal X and will be given to the adder 7.

On the other hand, in this state, as the count output of the frame counter 27 is "0", the frame designating signal FN designating the 0th frame 0F will be supplied, the difference waveform data DD1 of 32 sampling points relating to the first elementary tone wave (frame waveform $F_0$) of the 0th frame 0F will be thereby read out of the difference waveform memory 6 progressively and repetitively according to the phase address signal X and be supplied to the adder 7 and subtracter 9, and, at the same time, the difference waveform data DD2 of 32 sampling points relatingly to the first elementary tone wave (frame waveform $F_1$) of the first frame 1F will be read out of the difference waveform memory 6 progressively and repetitively according to the phase address signal X to be given to the subtracter 9. The subtraction data DD3 having the contents of the difference (DD2−DD1) of these two difference waveform data DD1 and DD2 obtained at the output end of the subtracter 9 will be multiplied by the coefficient signal K in the multiplier 10 and the multiplication output K·DD3 will be given to the adder 7 through the gate 12.

In the adder 7, the basic waveform data RD having the contents of the first term $F_R$ of the above described formula (4), the first difference waveform data DD1 having the contents of the second term $F_i-F_R$ of the formula (4) and the weighted incremental data K·DD3 having the contents of the second term $K\cdot(F_{(i+1)}-F_i)$ of the formula (1) are added and the addition result is supplied as the tone wave data MD.

At this time, as the contents of the repetition number counter 22 are still "0", the computation sequence data CV given to the coefficient generator 11 will be "0" and therefore the coefficient signal K will be also "0".

Thus, in the first tone wave period (one cycle) of the 0th frame 0F, the tone wave data MD having as the contents the sum of the basic waveform data RD from the basic waveform generator 5 and the difference waveform memory 6 and the first difference waveform data DD1 will be obtained.

Therefore, the tone wave data MD obtained at this time will correspond to the first elementary tone wave of the 0th frame 0F.

When the phase address signal X of the accumulator 3 ends addressing the 31st sampling point, the accumulator 3 will supply the carry signal CA1 and thereby the count contents of the repetition number counter 22 will become "1".

At this time, the contents of the computation sequence data CV given to the coefficient generator 11 will change from "0" to "1" and therefore the contents of the coefficeint signal K will change from "0" to 1/TCV. Thereby, the weighted incremental waveform data K·DD3 having risen by one step (1/TCV) will be given to the adder 7 from the multiplier 10. Thus, the value at each sampling point of the tone wave data MD will change by one step (1/TCV) by which the coefficient signal K has risen and, as a result, the tone wave having separated from the elementary tone wave of the 0th frame 0F and having a little approached the elementary tone wave of the first frame 1F will be able to be obtained.

In this state, when the phase address signal X of the accumulator 3 ends addressing the 31st sampling point, by the regenerated carry signal CA1, the contents of the repetition number counter 22 will become "2". Therefore, when the contents of the computation sequence data CV of the coefficient generator 11 become "2", the coefficient signal K will become 2/TCV. Therefore, the same as in the above described case, the tone wave data MD of the adder 7 will change to approach the elementary tone wave for the first frame 1F further by one step.

In the following, in the same manner, whenever the accumulator 3 generates the carry signal CA1, the contents of the coefficient signal K will rise by 1/TCV and, in response to this rising, the tone wave data obtained at the output end of the adder 7 will approach the elementary tone wave (beginning wave) of the first frame 1F.

On the other hand, when the frame designating signal FN designates the 0th frame 0F in the repetition number designating memory 25, the repetition number data TCV representing the number of elementary tone waves contained in the 0th frame 0F will be supplied to the comparator 24.

When the last tone wave period of the 0th frame 0F ends, the computation sequence data CV of the repetition number counter 22 will coincide with the repetition number data TCV supplied from the repetition number designating memory 25 and therefore the coincidence detection output EQ1 will be given to the frame counter 27 through the gate 26 from the comparator 24 and thereby the contents of the frame counter 27 will be changed from "0" to "1". Therefore, the difference waveform memory 6 will be designated with the first frame 1F by the frame designating signal FN and, the repetition number designating memory 25 will supply the repetition number data TCV relating to the first frame 1F.

Therefore, the first difference waveform data DD1 of the difference waveform memory 6 will relate to the difference tone wave (frame waveform $F_1$) at the beginning of the frame 1F and the second difference waveform data DD2 will relate to the difference tone wave (frame waveform $F_2$) at the beginning of the frame 2F.

On the other hand, as the repetition number counter 22 is reset through the OR circuit 23 by the coincidence detection output EQ1 of the comparator 24, the computation sequence data CV will return to "0". Thereby, the contents of the coefficient signal K generated in the coefficent generator 11 will become "0". Therefore, the contents of the tone wave data MD obtained at the output end of the adder 7 will represent the sum of the basic waveform data RD and the first difference waveform data DD1 relating to the elementary tone wave of the first frame 1F and therefore the elementary tone wave of the first frame 1F, that is, the frame waveform $F_1$.

Thereafter, in the same manner as is described above on the 0th frame 0F, whenever the accumulator 3 supplies the carry signal CA1, the computation sequence data CV will rise by "1" and in response to it, the value of the coefficient signal K will rise progressively and therefore the tone wave data MD representing the waveform gradually approaching from the elementary tone wave (beginning wave) of the first frame 1F toward the elementary tone wave (beginning wave) of the second frame 2F will be interpolatingly computed.

When such operation is repeated and the last tone wave period of the final frame NF ends, the contents of the frame designating signal FN of the frame counter 27 will become (N+1) and therefore will be detected by the final frame detector 28 to operate the gate 12 to close. At this time, the difference waveform memory 6 will supply the first difference waveform data DD1 relating to the difference tone wave at the last end of the Nth frame NF in response to the contents (N+1) of the frame designating signal FN.

At this time, the difference waveform memory 6 will be kept on supplying the difference waveform data for the last one wave period of the final frame as the first difference waveform data DD1, these difference waveform data will be added in the adder 7 to the basic waveform data RD of the basic waveform generator 5 and, as a result, in case the key depressing time on the keyboard 1 is very long, the last tone wave of the final frame NF will be repetitively supplied.

Therefore, the tone wave data MD representing the last tone wave of the final frame NF will be continuously supplied to the adder 7.

According to such construction of FIG. 3 as in the above, it is necessary that only the difference waveform data representing the differences from the basic waveform on the elementary tone wave (frame waveform) at the beginning of the frame in response to each frame are stored in the difference waveform memory 6 and, at the same time, the basic waveform data representing the basic waveform are stored in the waveform memory within the basic waveform generator 5, thereby the tone wave continuously changing progressively will be able to be formed, thus the waveform data to be stored in the waveform memory will be only the basic waveform data for one wave period (one cycle) and the difference waveform data for one wave period (one cycle) for each frame. Thus, the memory capacity of the waveform memory can be made very small.

Embodiment 2

Figure 6:
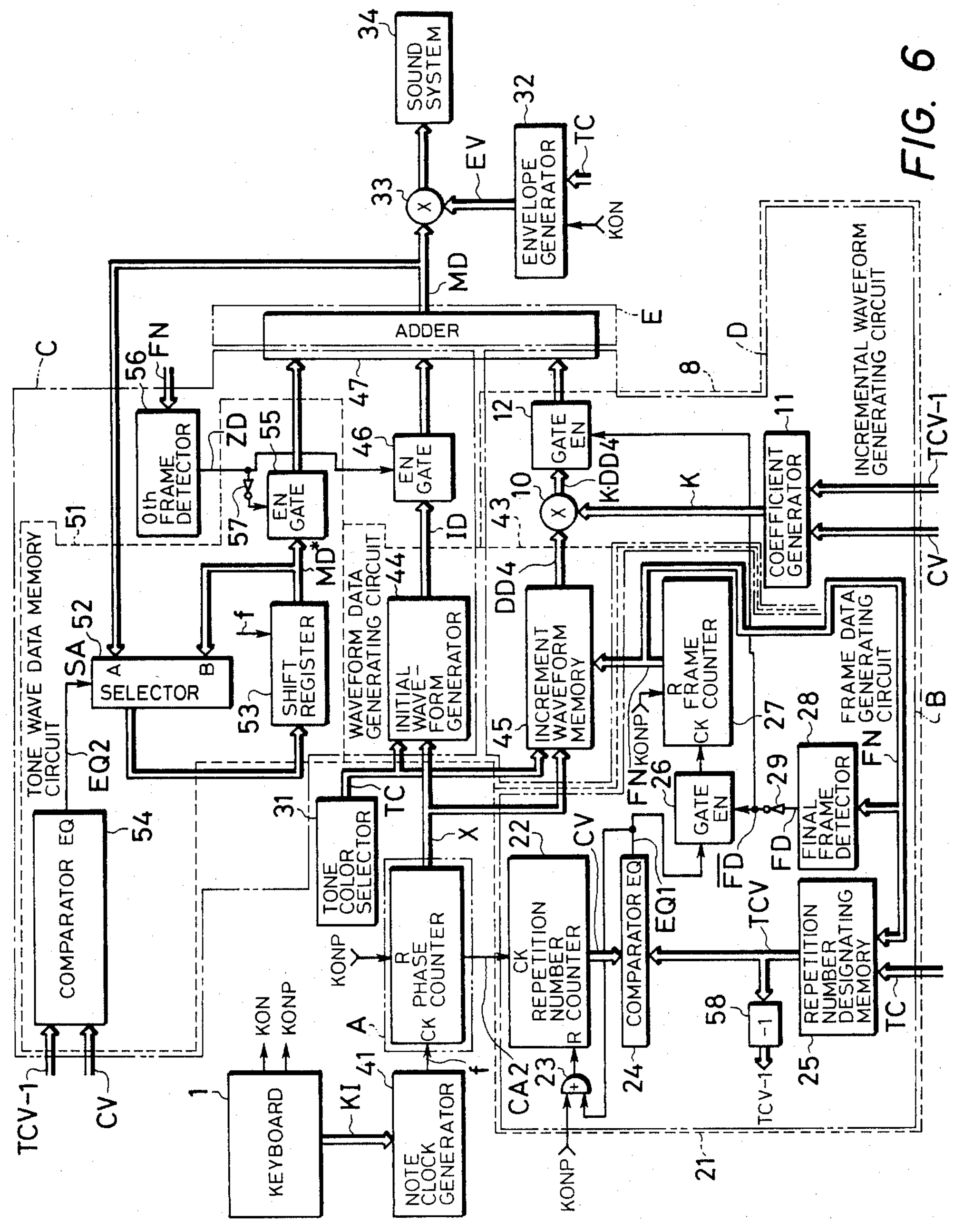
FIG. 6 is a block diagram showing a second embodiment of the tone synthesizing apparatus according to the present invention.

FIG. 6 shows the second embodiment of the tone wave synthesizing apparatus according to the present invention. In this embodiment, for each frame, the increment waveform data relating to the wave increment per cycle between the elementary tone wave of the designated frame and the elementary tone wave of the preceding frame are stored in the waveform memory.

The tone wave synthesizing apparatus of this embodiment is to be applied to a monophonic electronic musical instrument and is shown in FIG. 6 by attaching the same reference numerals to the respective corresponding parts in FIG. 3. The key information KI from the keyboard 1 is given to the note clock generator 41. The note clock generator 41 supplies to the phase counter 42 as a clock signal the frequency signal f corresponding to the pitch of the depressed key on the basis of the key information KI given from the keyboard 1. This frequency signal f is the pulse signal of the frequency obtained by multiplying the frequency corresponding to the pitch of the key represented by the key information KI by the number (32 in this embodiment) of the sampling points contained in one tone wave period, that is, one cycle.

The phase counter 42 is a scale-of-32 counter receiving as a reset signal the key-on pulse signal KONP from the keyboard 1, operates to count whenever each pulse of the frequency signal f is given after the key-on pulse signal KONP arrives, and supplies the count output as the phase address signal X designating progressively each of 32 sampling points within one tone wave period. The phase counter 42 supplies the carry signal CA2 whenever the phase address signal X makes a round.

The frame data generator 21 has the same construction as is described above in connection with FIG. 3. However, in the case of the FIG. 6, the repetition number counter 22 will operate to count according to the carry signal CA2 from the phase counter 42 and the final frame detector 28 will detect the frame designating signal FN when it is of the contents (N) representing the final frame NF and will supply the detection output FD of "1".

The waveform data generating circuit 43 includes, for example, the initial waveform generator 44 including a waveform memory and the increment waveform memory 45. The sample values for 32 sampling points of the first elementary tone wave among the plural tone waves contained in the 0th frame 0F of the tone wave MW to be synthesized are stored as initial waveform data ID in the initial waveform generator 44, the initial waveform data ID of the 32 sampling points are read out progressively with the phase address signal X as the address signal for the memory and thus the initial waveform data ID obtained at the output end are supplied as the first addition input to the adder 47 through the gate 46.

Figure 7:
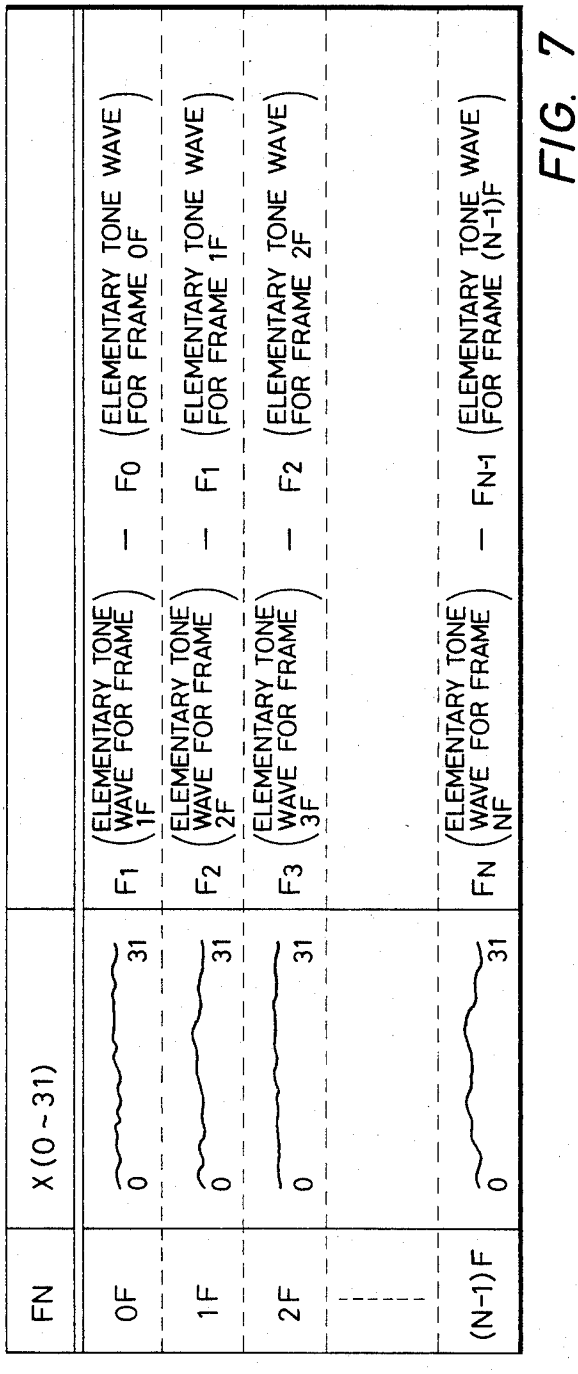
FIG. 7 is a chart showing the contents of a difference waveform memory in the embodiment of FIG. 6.

Also, as shown in FIG. 7, the increment waveform data for each beginning tone wave period (32 sampling points) of the frames 0F to (N−1)F except the final frame NF are stored in the increment waveform memory 45. Here, the increment waveform data of each frame have the contents representing the inclement obtained by subtracting the elementary tone wave in each frame from the elementary tone wave in the next frame.

That is to say, as shown in the column of "0F" in FIG. 7, the increment waveform data of the 0th frame 0F are data representing the increment obtained by subtracting the elementary tone wave at the beginning of said frame 0F from the elementary tone wave at the beginning of the frame 1F, at respective sampling points. Also, as shown in the column of "1F" in FIG. 7, the increment waveform data of the first frame 1F are data representing the increment obtained by subtracting the elementary tone wave in the frame 1F from the elementary tone wave in the frame 2F, at respective sampling points. In the same manner, the increment waveform data of the other frames 2F to (N−1)F are data each representing the increments obtained by subtracting the elementary tone waves of each frame from that of next frame, at respectively corresponding sampling points. As there is no next frame to the final frame NF, there are no increment waveform data relating to this frame NF.

These increment waveform data stored in the increment waveform memory 45 are addressed and read out by the frame designating signal FN obtained from the frame counter 27 in the frame data generating circuit 21 and the phase signal X, and thus the increment waveform data DD4 obtained at the output end are multiplied by the coefficient signal K in the multiplier 10 and given to the adder 47 as the second addition input.

The initial waveform generator 44 and increment waveform memory 45 store a plurality of kinds of the above described waveform data ID and DD4 corresponding to respective tone colors which can be selected by the tone color selector 31 so that, when the corresponding waveform data ID and DD4 are designated by the tone color selecting output TC given from the tone color selector 31, the waveform data ID and DD4 corresponding to the selected tone colors may be supplied.

The addition output of the adder 47 is given as the tone wave data MD to the multiplier 33, to which the envelope waveform signal EV is given, and is given to the input end A of the selector 52 in the tone wave data memory circuit 51.

The tone wave data memory circuit 51 receives, and stores the tone wave data MD of the last tone wave period of each frame and operates to give the tone wave data MD to the adder 47 in the case of forming the elementary tone wave of the next frame.

The computation sequence data CV of the repetition number counter 22 and the data TCV−1 obtained by subtracting "1" from the repetition number TCV of the repetition number designating memory 25 and supplied from the subtracter 58 are given to the comparator 54, and the selector 52 is switched to the input A selecting state by the coincidence detection output EQ2.

Here, the coincidence of the data CV with the data TCV−1 means that the last tone wave period in each frame is now to be interpolatingly computed. Therefore, at this time, the selector 52 takes the tone wave data MD (having as the contents the interpolating computation result relating to the last tone wave cycle) of the adder 47 into the shift register 53.

The shift register 53 has 32 stages corresponding to 32 sampling points and is so constructed as to be shifted by the frequency signal f from the note clock generator 41 so that, when the tone wave data MD at one sampling point are inputted to the shift register 53 and the time of one elementary tone wave period (one cycle) has elapsed, the shift register 53 will supply them from the output end as tone wave data MD*.

The tone wave data MD* from the shift register 53 will be given to the input end B of the selector 52, will be fed back to the input end of the shift register 53 through the selector 52 when the contents of the output CV of the repetition number counter 22 are CV≠TCV−1, will be stored in the shift register 53 while the tone wave data MD* being dynamically circulated and will be continuously given as the third addition input to the adder 47 through the gate during the circulation.

The gate 55 receives the detection output ZD of the 0th frame detector 56 at the enable terminal through the inverter 57 and is controlled to close during the 0th frame. Also the detection output ZD of the 0th frame detector 56 will be given to the gate 46 so that the initial waveform data ID of the initial waveform generator 44 may be thereby given to the adder 47 through the gate 46 only during the 0th frame 0F.

In the embodiment in FIG. 6, when a key is depressed and the key information KI, key-on signal KON and key-on pulse signal KONP of the key are generated in the keyboard 1, the phase counter 42, repetition number counter 22 and frame counter 27 will be simultaneously reset by the key-on pulse signal KONP to begin a new counting operation. In this state, the contents of the frame designating signal FN of the frame counter 27 will be "0", therefore the gate 46 will be controlled to open by the detection output ZD of the 0th frame detector 56, the gate 55 will be controlled to close and thus the initial waveform data ID of the initial waveform generator 44 will be supplied to the adder 47. At this time, the increment waveform memory 45 will be controlled by the frame designating signal FN to supply to the multiplier 10 the increment waveform data DD4 representing the increment waveform (FIG. 7) of the 0th frame 0F.

However, as the computation sequence data CV of the repetition number counter 22 is "0" during the first tone wave period of the 0th frame 0F, the contents of the coefficient signal K from the coefficient generator 11 will be "0", therefore no increment waveform data DD4 will be supplied to the adder 47 and, after all, the initial waveform data ID will be supplied as they are as the tone wave data MD from the adder 47.

At this time, as the coincidence output EQ2 is not obtained in the comparator 54, the tone wave data MD will not be taken into the shift register 53.

When the first increment tone wave period of the 0th frame 0F ends, the carry signal CA2 will be supplied from the phase counter 42 and the contents of the repetition number counter 22 will become "1". At this time, as the contents of the computation sequence data CV becomes "1", the coefficient generator 11 will raise the contents of the coefficient signal K by 1/(TCV−1), the increment waveform data DD4 will be multiplied by this raised coefficient signal K and the weighted incremental waveform data K·DD4 will be given to the adder 47. Thus, the adder 47 will add the initial waveform data ID and the weighted increment waveform data K·DD4 together and will supply them as the tone wave data MD. Thereby, the tone approaching from the elementary tone wave of the 0th frame 0F to the elementary tone wave of the next frame 1F will be generated from the sound system 34.

When the second tone wave period in this frame 0F ends, the carry signal CA2 will be again supplied from the phase counter 42, thereby the contents of the repetition number counter 22 will change to "2", the coefficient signal K of the coefficient generator 11 will further rise by 1/(TCV−1) and correspondingly the contents of the weighted increment waveform data K·DD4 to be given to the adder 47 will rise by one step. After all, the contents of the tone wave data MD will become the waveform further approaching to the elementary tone wave of the first frame 1F in the third tone wave period of the 0th frame 0F.

Thereafter, in the same manner, when each tone wave period of the 0th frame 0F ends (whenever the carry signal CA2 is generated), the contents of the coefficient signal K to be given to the multiplier 10 will rise by 1/(TCV−1), thereby the contents of the weighted incremental waveform data K·DD4 will become larger step by step progressively and, as a result, the contents of the tone wave data MD will approach to the first elementary tone wave of the first frame 1F.

When the contents of the computation sequence data CV of the repetition number counter 22 becomes "TCV−1" (therefore the last tone wave period of the frame 0F sets in), the comparator 54 of the tone wave data memory circuit 51 will detect it and will supply the coincidence detection output EQ2 to control the selector 52 to the input A selecting state and will take the tone wave data MD from the adder 47 into the shift register 53. On the other hand, as the computation sequence data CV becomes equal to the data TCV−1, the coefficient signal K of the coefficient generator 11 will become "1", thus the increment waveform data DD4 of the increment waveform memory 45 will be given as it is as the weighted increment waveform data K·DD4 to the adder 47 and will be added to the initial waveform data ID of the initial waveform generator 44 to supply the tone wave data MD representing the last elementary tone wave of the 0th frame 0F. The tone wave data MD of this last tone wave period will be supplied to the sound system 34 through the multiplier 33 and will be taken progressively into the shift register 53 through the selector 52.

When the generation of the tone wave data MD of this last elementary tone wave period ends and the carry signal CA2 is supplied from the phase counter 42, the computation sequence data CV from the repetition number counter 22 will coincide with the repetition number data TCV of the repetition number designating memory 25, therefore the coincidence detection output EQ1 will be obtained from the comparator 24, the contents of the frame counter 27 will be made "1" and, at the same time, the contents of the repetition number counter 22 will be returned to "0". Therefore, the increment waveform data DD4 representing the increment waveform (FIG. 7) relating to the first frame 1F will be supplied from the increment waveform memory 45 and the coefficient signal K of the coefficient generator 11 will return to "0".

On the other hand, since the coincidence detection output EQ2 will be no longer obtained from the comparator 54 of the tone wave data memory circuit 51, the selector 52 will select the tone wave data MD* of the shift register 53, will feed them back to the input end of the shift register 53 and will circulatingly store them.

On the other hand, as the contents of the frame counter 27 become "1", the detection output ZD of the 0th frame detector 56 will become "0", the gate 55 will be controlled to open and the gate 46 will be controlled to close. As a result, the tone wave data MD relating to the last tone wave period of the 0th frame 0F will be repetitively given as the tone wave data MD* to the adder 47 through the gate 55 during the this first frame 1F.

Therefore, in the adder 47, the tone wave data MD are formed by adding the tone wave data MD* and the weighted increment waveform data K·DD4 together in this frame 1F. That is to say, in the adder 47, when the weighted increment waveform data K·DD4 changing progressively with the progress of each tone wave period in this first frame 1F are added to the tone wave data MD* stored in the shift register 53, the tone wave data MD having the content gradually approaching to the elementary tone wave at the beginning of the second frame 2F will be able to the formed progressively. When the last tone wave period of the first frame 1F sets in (CV=TCV−1), the coincidence detection output EQ2 will be generated, the tone wave data MD of one wave period then will be taken into the shift register 53 and will be stored to form the tone wave data MD in the next frame, that is, the second frame 2F.

Thereafter, in the same manner, in each frame following progressively the tone wave data MD will be taken into the shift register 53 in the last tone wave period and the operation of forming the tone wave data MD in the next frame will be carried out progressively.

When the final frame NF sets in, it will be detected in the final frame detector 28 to control the gate 12 and 26 to close. Therefore, the tone wave data MD* (whose contents are the tone wave data MD in the last tone wave period of the frame (N−1)F) of the shift register 53 will come to be repetitively supplied as the tone wave data MD through the adder 47. In this final frame NF, the tone based on the tone wave data MD of the last tone wave period of the frame (N−1)F will be generated from the sound system 34.

Thus, according to the embodiment in FIG. 6, the data to be stored in the waveform memory may be only the initial waveform data and the increment waveform data (FIG. 7) representing the increments between the elementary tone waves of the adjacent frames following progressively and therefore the amount of the waveform data to be stored can be made much smaller than before. Particularly, in the case of sounding such tone as of a small change in the tone wave in each frame following progressively, the value of the increment waveform data to be stored in the increment waveform memory will be small and therefore the memory capacity will be able to be made much smaller.

Figure 8:
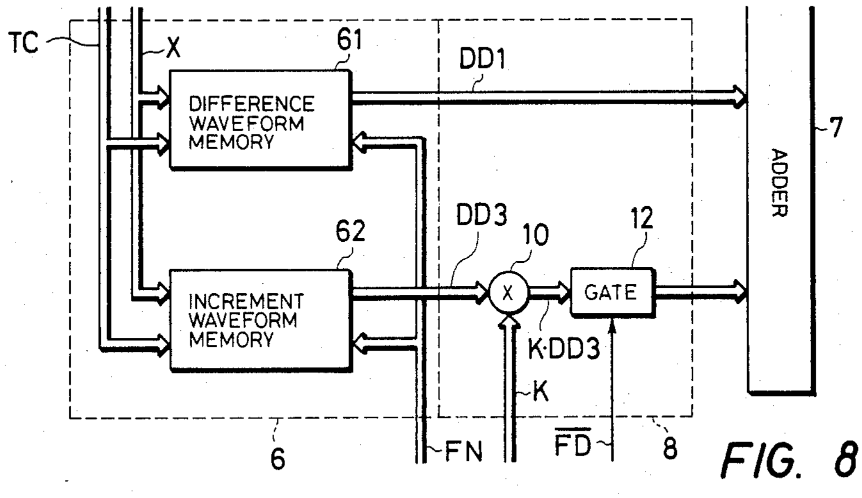
FIGS. 8 and 9 are partial block diagrams showing modifications of the embodiment of FIG. 3.

Modifications of the above mentioned Embodiments (1) In the embodiment in FIG. 3, such construction as in FIG. 8 may be used for the construction of the difference waveform memory 6. That is to say, the difference waveform data DD1 (FIG. 4) from the difference waveform memory 6 in FIG. 3 are stored in the difference waveform memory 61 in response to each frame and moreover the increment waveform data DD3 (represented by the formula (6)) obtained from the subtracter 9 in FIG. 3 are stored in the increment waveform memory 62 in response to each frame. The difference waveform data DD1 read out of the difference waveform memory 61 are given directly to the adder 7 and the increment waveform data DD3 read out of the increment waveform memory 62 are given directly to the multiplier 10.

Thereby, the effect of being able to omit the subtracter 9 in the embodiment in FIG. 3 can be obtained.

Figure 9:
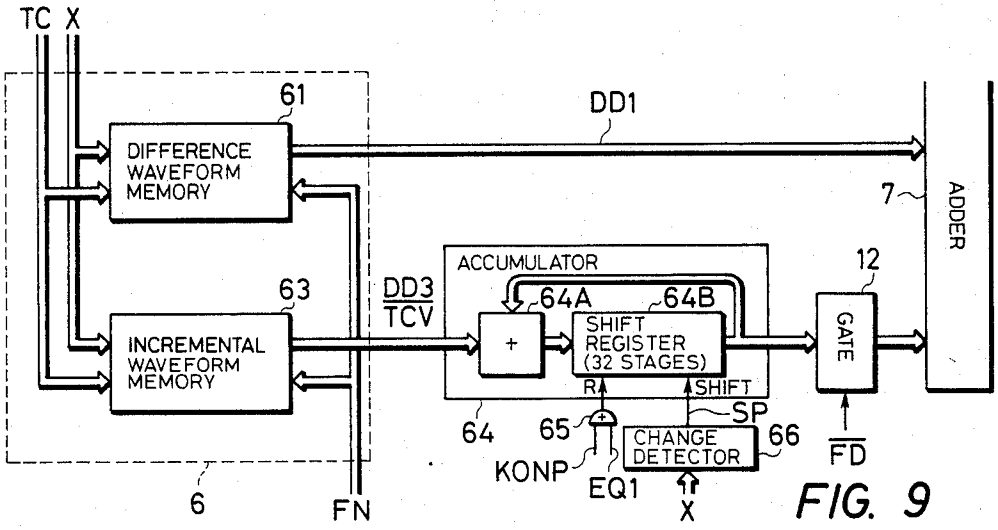

(2) In the case of the construction in FIGS. 3 and 8, the weighted increment waveform data K·DD3 are obtained by multiplying the increment waveform data DD3 by the coefficient K but, alternatively the value "DD3/TCV" obtained by dividing the increment waveform data DD3 by the number of elementary tone waves contained in each frame, that is, the repetition number data TCV is stored previously in the incremental waveform memory 63 as shown in FIG. 9 so that, in the case of reading out these data, they may be accumulated in the accumulator 64 and supplied to the gate 12.

In such case, the accumulator 64 consists of an adder 64A and a shift register 64B having as many stages (32 stages) as the sampling points in the elementary tone wave period. The shift register 64B receives as a reset signal the key-on pulse signal KONP and the coincidence detection output EQ1 of the comparator 24 (FIG. 3) throught the OR circuit 65 so as to reset the contents of all the stages and receives as the shift clock signal the output pulse SP of the change detector 66 supplying the pulse whenever the phase address signal X of the accumulator 3 changes.

Thus, whenever each frame begins, the accumulator 64 will be reset and then will accumulate at the respective sampling points the output data (DD3/TCV) of the incremental waveform memory 63 with the progress of the tone wave period in each frame. Thus, the output of the accumulator 64 will change step by step with the output data (DD3/TCV) of the waveform memory 63 as a unit and, as a result, the same data as the weighted increment waveform data K·DD3 obtained from the multiplier 10 in FIG. 3 will be able to be obtained.

Thus, the subtracter 9, multiplier 10 and coefficient generator 11 used in the embodiment in FIG. 3 will be able to be omitted.

(3) In the case of the embodiment in FIG. 3, the data representing the difference between the elementary tone wave and basic waveform of each frame are used as the data to be stored in the difference waveform memory 6 but alternatively, for example, the data representing the increment between the last tone wave and basic waveform of each frame may be used.

(4) In the embodiment in FIG. 6, the same as is described in the above on FIG. 9 as of the data to be stored in the increment waveform memory 45, the value "DD4/TCV−1" obtained by dividing the increment waveform data DD4 by the data TCV−1 for each frame is stored and the stored data may be accumulated in the accumulator at each sampling point with the progress of the tone wave period in each frame. Thus, the multiplier 10 and coefficient generator 11 in the case of FIG. 6 will be able to be omitted.

(5) In the embodiment in FIG. 6, the shift register 54 is used as a storage element in the tone wave data memory circuit 5 but, alternatively, such memory as a RAM etc. may be used.

(6) In the embodiments in FIGS. 3 and 6, the elementary tone wave period need not be one cycle but may be ½ cycle, ¼ cycle or a plural of cycles (for example, two cycles).

For example, in case the elementary tone wave period is made ½ cycle and the basic waveform data and initial waveform data for ½ cycle are to be stored respectively in the basic waveform generator 5 and initial waveform generator 44, the one cycle waveform may be obtained by alternately giving positive and negative polarities to the ½ cycle waveform read out.

In case the elementary tone wave sequence is made two cycles, the accumulator 3 in FIG. 3 and the phase counter 42 in FIG. 6 may be so constructed as to supply such phase address signal X as addresses each sampling point for the two cycles and the construction supplying the carry signal whenever addressing each sampling point makes one round may be used. Further, in such case, the repetition number data TCV may be data representing the number with two cycles as a unit, the difference waveform data to be stored in the difference waveform memory 6 in FIG. 3 and the increment waveform memory 45 in FIG. 6 may be for two cycles and the shift register 53 in FIG. 6 may be set at the stage number corresponding to the sampling points for two cycles.

(7) In the embodiments in FIGS. 3 and 6, the waveform memorizing system for the waveform memory used for the basic waveform generator 5 and initial waveform generator 44 and difference waveform memories 6 and 45 is not limited to be a PCM but may be such waveform encoding system as DPCM, DM, APCM, ADPCM or ADM.

(8) In the case of the embodiments in FIGS. 3 and 6, the waveform memories are used for the basic waveform generator 5 and initial waveform generator 44 but, alternatively, such various waveform generating methods as generating waveforms by computation can be used as required.

(9) In the case of the embodiments in FIGS. 3 and 6, the present invention is described as applied to a monophonic electronic musical instrument but can be applied even to a polyphonic electonic musical instrument by a channel assigning system. In such case, there can be used a construction wherein each circuit block is operated in time division for each of a plural of tone production channels or each circuit block is provided in parallel with each tone production channel.

(10) In the embodiments in FIGS. 3 and 6, the present invention is described as applied to an electronic musical instrument synthesizing tone waves corresponding to the musical scale tones but is not limited to it and can be applied in the same manner also to a tone wave synthesizing apparatus made to synthesize rhythm tones (particularly not rhythm tones of the noise series but rhythm tones having such cyclic waveforms as of a drum).

(11) In the embodiments in FIGS. 3 and 6, for the tone wave MW (FIG. 1(A)) to be synthesized, the frames 0F to NF may be sectioned to be of uniform or non-uniform lengths over all. For example, if such part in which the tone wave MW changes complicatedly as the tone wave rising part (attacking part) is divided into many frames at comparatively short intervals, a tone wave approximating to the natural musical instrument sound will be able to be reasonably synthesized.

(12) In the case of the embodiments in FIGS. 3 and 6, the tone wave is to be synthesized by applying the present invention to the entire range from the beginning to the end of the tone wave MW as described above on FIG. 1 but, alternatively, only a part of the tone wave may be synthesized. For example, whereas, in the attcking part in which the tone wave changes comparatively complicatedly, a plural of continuous periodic waveforms (having the waveforms of the natural musical instrument sounds) are stored as they are in the waveform memory by the conventional method, in the waveform part in which the changes are comparatively few after the attacking part, the tone waves may be synthesized on the basis of the present invention.

Embodiment 3

Figure 10:
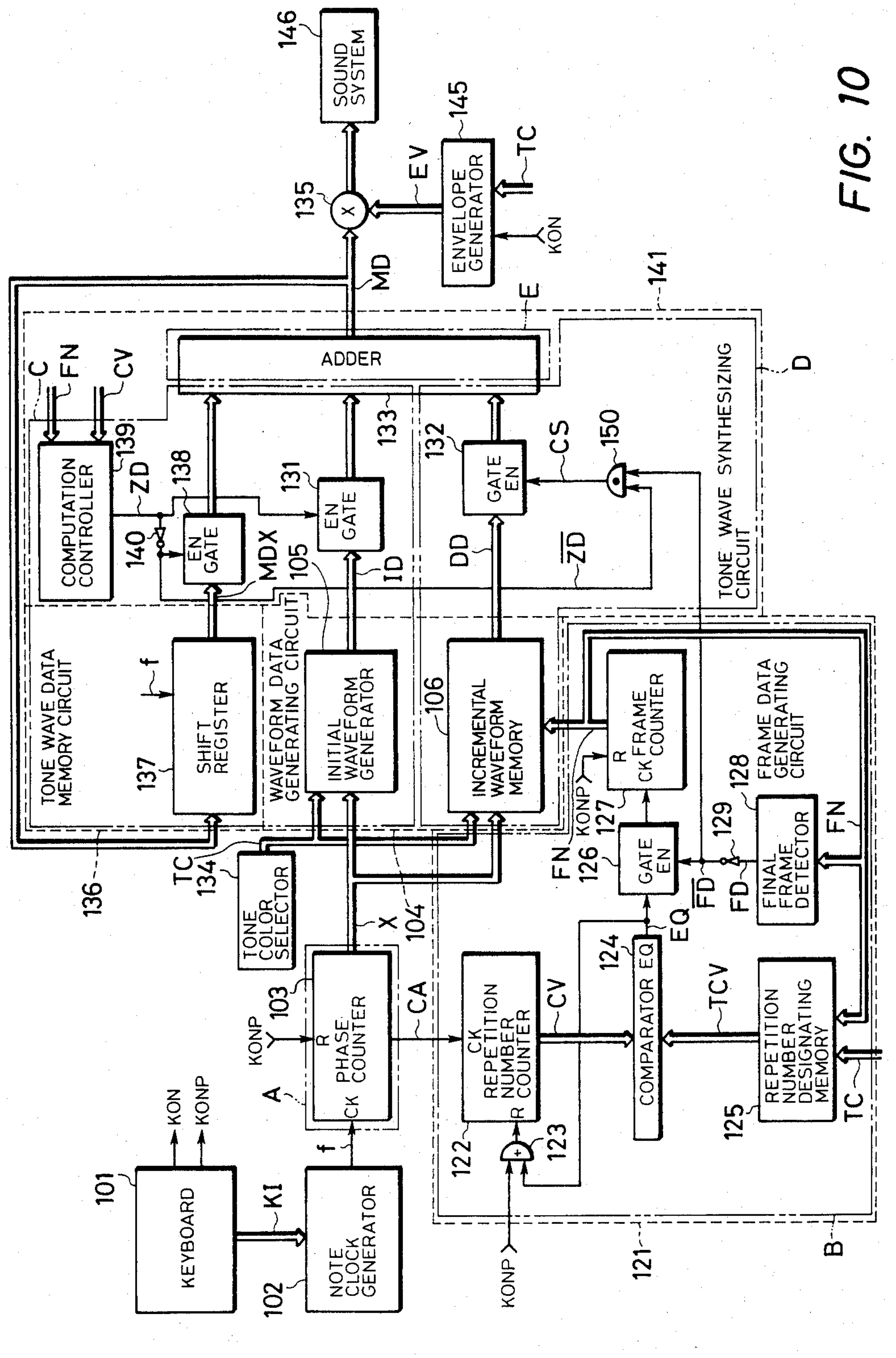
FIG. 10 is a block diagram showing another embodiment of the tone wave synthesizing apparatus according to the present invention.

FIG. 10 shows another embodiment of the tone wave synthesizing apparatus according to the present invention. The keyboard 101 having a single key preferentially selecting function supplies to the note clock generator 102 the key information KI relating to one key most preferential among simutaneously depressed keys and also supplies the key-on signal KON (a signal rising to a logic "1" while the key is depressed) and the key-on pulse signal KONP (a pulse generated when the key-on signal KON rises to the logic "1").

The note clock generator 102 supplies to the phase counter 103 as a clock signal the frequency signal f corresponding to the pitch of the depressed key on the basis of the key information KI from the keyboard 101. This frequency signal f is a pulse signal of the frequency obtained by multiplying the frequency corresponding to the pitch of the key represented by the key information KI by the number (32 in this embodiment) of the sampling points contained in one elementary tone wave period, that is, one cycle.

The phase counter 103 constructs a phase addressing means A and is a scale-of-32 counter receiving as a reset signal the key-on pulse signal KONP from the keyboard 101 so that, after the key-on pulse signal KONP arrives, whenever each pulse of the frequency signal f is given, it will be counted and the count output will be supplied as the phase address signal X addressing progressively each of the 32 sampling points within one tone wave period. Also, the phase counter 103 will supply the carry signal CA whenever the phase address signal X makes one round.

In the case of this embodiment, the phase address signal X consists of digital data of 5 bits changing successively and periodically from "00000" to "11111" so that, during the change of 1 period of the phase address signal X, 32 sampling points, that is, the 0th to 31st sampling points may be addressed at a speed corresponding to the pitch of the depressed key.

The repetition number counter 122 of the frame data generator 121 (time frame designating means B) is a counter operated to count by the carry signal CA generated in the phase counter 103, will count up "1" whenever the phase address signal X has addressed each sampling point and will supply the counted contents as computation sequence data CV.

The computation sequence data CV of this repetition number counter 122 are given to the comparator 124 and are compared with the repetition number data TCV obtained at the output end of the repetition number disignating memory 125 and, when the computation sequence data CV coincide with the repetition number data TCV, supplies the coincidence detection signal EQ to the count input end of the frame counter 127 through the gate 126 and returns them to the reset input end of the repetition number counter 122. By the way, the key-on pulse signal KONP is further put in the OR circuit 23.

The repetition number designating memory 125 has stored in response to the respective tone colors the repetition number data TCV (TCV0, TCV1, . . . TCVN) representing the numbers of elementary tone waves to be repeated respectively in the respective frames 0F to NF and read out the repetition number data TCV designating by the tone color selecting signal TC from the tone color selector 134 and the frame designating signal FN from the frame counter 127 and supplies them to the comparator 124. Therefore, for each frame, when the repetition number designated by the repetition number data TCV from the repetition number designating memory 125 and the contents of the count output CV of the repetition number counter 122 coincide with each other (that is, whenever each frame ends), the comparator 124 will generate a coincidence detection output EQ, will reset the repetition number counter 122 and will count up the frame counter 127 by "1".

The count contents of this frame counter 127 after it is reset by the key-on pulse signal KONP are given to the incremental waveform memory 106 as a frame designating signal FN.

The frame designating signal FN of the frame counter 127 is given also to the final frame detector 128. The final frame detector 128 supplies the final frame detection output FD rising to the logic "1" when the contents of the frame designating signal FN become (N+1) and this final frame detection output FD is given as an inverting output $\overline{FD}$ to the enable terminal of the gate 126 through the inverter 129. Therefore, when the final frame NF ends, if the gate 126 is closed, the subsequent counting operation of the frame counter 127 will be stopped so that the frame designating signal FN will no change.

The phase address signal X from the phase counter 103 is given as an address signal to the waveform data generating circuit 104.

The waveform data generating circuit 104 includes, for example, the initial waveform generator 105 consisting of the waveform memory and the interpolating incremental waveform memory 106 as a waveform change memory means. The initial waveform generator 105 has stored as the initial waveform data ID the sampling values of the 32 sampling points of the first tone wave among the plural tone waves contained in the 0th frame 0F of the tone wave MW to be synthesized, the initial waveform data ID of the 32 sampling points are read out progressively with the phase address signal X as address signals and thus the initial waveform data ID obtained at the output end are supplied as the first addition input to the adder 133 of the tone wave synthesizing circuit 141 through the gate 131.

In the incremental waveform memory 106 are stored the incremental waveform data per each tone wave period (32 sampling points) on the frames 0F to (N−1)F except the final frame NF as shown in FIG. 3. Here, the incremental waveform data of each frame have the contents representing the value obtained by dividing by the repetition number TCV the increment obtained by subtracting at each sampling point the first elementary tone wave in each frame from the first tone wave in the preceding frame of each frame.

That is to say, as shown in the column of "0F" in FIG. 11, the incremental waveform data on the 0th frame 0F are data representing the value obtained by dividing by the repetition number TCV0 the increment obtained by subtracting at each sampling point the first tone wave in the frame 0F from the first tone wave of the frame 1F. Also, as shown in the column of "1F" in FIG. 11, the incremental waveform data on the first frame 1F are data representing the value obtained by dividing by the repetition number TCV1 the increment obtained by subtracting at each sampling point the first tone wave in the frame 1F from the first tone wave in the frame 2F. In the same manner, the incremental waveform data on each of the other frames 2F to (N−1)F are data representing the value obtained by dividing by the repetition number TCV determined on each frame the increment obtained by subtracting at each sampling point the first tone wave of each frame from the next frame, as there is no frame after the final frame NF, there is no incremental waveform data relating to this frame NF.

These incremental waveform data stored in the incremental waveform memory 106 are addressed by the frame designating signal FN obtained from the frame counter 127 of the frame data generating circuit 121 and the phase address signal X and are read out, and the incremental waveform data DD thus obtained at the output end are given as the second addition input to the adder 133 of the tone wave synthesizing circuit 141 through the gate 132.

The initial waveform generator 105 and incremental waveform memory 106 store respectively a plurality of kinds of the above described waveform data ID and DD in response to each tone color selectable by the tone color selector 134 and will supply, when the corresponding waveform data ID and DD are designated by the tone color selecting output TC given from the tone color selctor 134, the waveform data ID and DD corresponding to the selected tone color.

The addition output of the adder 133 is supplied as the tone wave data MD to the multiplier 135 to which is given the envelope signal EV and is given to the shift register 137 of the tone wave data memory circuit 136.

The tone wave data memory circuit 136 takes in the tone wave data MD from the adder 133, stores them temporarily and operates to supply them to the adder 133 in the case of carrying out the next interpolating computation.

The shift register 137 has 32 stages corresponding to the 32 sampling points so as to be shifted by the frequency signal f from the note clock generator 102 so that, when the tone wave data MD at a certain sampling point are inputted into the shift register 137, if the time for one elementary tone wave period (one cycle) has elapsed, the shift register 137 will supply them as the tone wave data MDX and will give them as the third addition input to the adder 133 through the gate 138.

The tone wave synthesizing circuit 141 has a computation controller 139 controlling the gates 131, 132 and 138. The computation controller 139 will supply the control output ZD rising to the logic "1" level when both of the frame designating data FN and computation sequence data CV are "0" (representing the first tone wave period of the 0th frame 0F).

The gate 138 receives at the enable terminal EN the control output ZD of the computation controller 139 through the inverter 140 so as to be controlled to close during first tone wave period of the 0th frame 0F.

The control output ZD of the computation controller 139 is given directly to the enable terminal EN of the gate 131 so that the initial waveform data ID of the initial waveform generator 105 may be given to the adder 133 through the gate 131 only during the first tone wave period of the 0th frame 0F.

Further, the control output ZD of the computation controller 139 is given to the two-input AND circuit 150 through the inverter 140. This AND circuit 150 supplies the control signal CS becoming logic "1" when the control output ZD is logic "0" (representing no first tone wave period of the 0th frame 0F) and the final frame detection output FD is logic "0" (representing that the frame now being treated is not the final frame) (when both of $\overline{ZD}$ and $\overline{FD}$ are logic "1") so as to control the gate 132 to open. Thereby, when the first tone wave period of the 0th frame 0F sets in and when the final frame NF sets in, the gate 132 will operate to close and will not feed the incremental waveform data of the incremental waveform memory 106 to the adder 133.

The multiplier 135 receives the envelope signal EV generated on the basis of the tone color selecting signal TC and key-on signal KON in the envelope generator 145, gives the envelope to the tone wave data MD and supplies them to the sound system 146.

By the way, in FIG. 10 the reference symbol C represents an elementary wave generating means, D represents an incremental wave generating means and E represents a wave combining means.

In the construction in FIG. 10, when a certain key is depressed and the key information KI, key-on signal KON and key-on pulse signal KONP of the key are generated from the keyboard 101, the phase counter 103, repetition number counter 122 and frame counter 127 will be simultaneously reset by the key-on pulse signal KONP to begin a new counting operation. In this state, as the contents of the frame designating signal FN of the frame counter 127 are "0" and the contents of the computation sequence data CV are also "0", the gate 131 will be controlled to open by the control output ZD of the computation controller 139 and the gates 132 and 138 will be controlled to close so that only the initial waveform data ID of the initial waveform generator 105 will be supplied to the adder 133.

Therefore, the adder 133 will supply to the multiplier 135 the initial waveform data ID as the tone wave data MD to sound the corresponding tone from the sound system 146 and to store this tone wave data MD in the shift register 137.

When the first tone wave period of the 0th frame 0F ends, the carry signal CA will be generated from the phase counter 103 and the computation sequence data CV from the repetition number counter 122 will become "1". At this time, when the control output ZD of the computation controller 139 falls to the logic "0" level, the gates 138 and 132 will be controlled to open and the gate 131 will be controlled to close. Therefore, the adder 133 will supply to the multiplier 135 and shift register 137 the tone wave data MD obtained by adding the incremental waveform data DD (FIG. 10) of the 0th frame 0F from the incremental waveform memory 106 to the tone wave data MDX (which will be the initial waveform data ID at this time) from the shift register 137. Thereby, the tone approaching to the first tone wave of the frame 1F next by one step from the first tone wave of the 0th frame 0F will be generated from the sound system 146 and this new tone wave data MD will be stored in the shift register 137.

When the second tone wave period in this frame 0F ends, the carry signal CA will be again supplied from the phase counter 103, but the computation controller 139 will keep on supplying the control output ZD of the logic "0" level unless the repetition number counter 122 and frame counter 127 are subsequently reset and both of the data CV and FN become "0", and the AND circuit 150 will keep on supplying the control signal CS of the logic "1" unless the final frame detector 128 subsequently detect the final frame NF and the detection output FD becomes the logic "1".

Therefore, the adder 133 will supply to the multiplier 135 and shift register 137 the new tone wave data MD obtained by again adding the incremental waveform data DD relating to the 0th frame 0F to the tone wave data MDX one cycle before from the shift register 137. Thus, the tone of the tone wave further approaching to the first tone wave of the first frame 1F in the third tone wave period of the 0th frame 0F will be synthesized from the sound system 146.

Thereafter, in the same manner, when each tone wave period ends on the 0th frame 0F (whenever the carry signal is generated), the contents of the tone wave data MD from the adder 133 will change step by step by the part of the incremental data DD from the incremental waveform memory 106 and, as a result, will approach progressively the first elementary tone wave of the first frame 1F.

When the operation of generating the tone wave data MD on the last tone wave period in the 0th frame 0F ends and the carry signal CA is generated from the phase counter 103, the computation sequence data CV from the repetition number counter 122 will coincide with the repetition number data TCV (TCV0) of the repetition number designating memory 125, therefore the coincidence detection output EQ will be obtained from the comparator 124, the contents of the frame counter 127 will be made "1" and, at the same time, the contents of the repetition number counter 122 will be reset to be "0". Therefore, the incremental waveform data DD representing the waveform change (in the column of "1F" in FIG. 11) relating to the first frame 1F will be supplied from the interpolating incremental waveform memory 106.

In this first frame 1F, the adder 133 will repetitively add in each tone wave period the incremental waveform data DD of the first frame 1F from the incremental waveform memory 106 to the tone wave data MDX before one tone wave period stored in the shift register 137 and thus the contents of the tone wave data MD will change step by step by the part of the incremental waveform data DD of the incremental waveform memory 106 from the first tone wave of the first frame 1F to the first tone wave of the second frame 2F and, as a result, will approach to the first tone wave of the second frame 2F.

Thereafter, in the same manner, in each frame following progressively, the corresponding incremental waveform data DD will be supplied from the incremental waveform memory 106 and will be repetitively added to the tone wave data MDX before one tone wave period so that the tone wave data MD in each frame will be formed progressively.

Thus, when the final frame NF sets in, it will be detected in the final frame detector 28, the gate 126 will be controlled to close and the gate 132 will be controlled to close through the AND circuit 150. Therefore, only the tone wave data MDX of the shift register 137 will be supplied to the adder 133 and therefore, in this final frame NF, the tone wave data MD of the last tone wave period of the frame (N−1)F will be continuously supplied.

Thus, according to the construction in FIG. 10, the data to be stored in the waveform memory may be only the initial waveform data and the data representing the waveform change (that is, the incremental waveform data (FIG. 11) made of the values obtained by dividing the increments between the first tone waves of the adjacent frames following progressively by the interpolating computation repetition number) and therefore the capacity of the waveform data to be stored can be made much smaller than in the conventional case. Particularly, the values of the incremental waveform data will become so small that the memory capacity will be able to be made much smaller.

Embodiment 4

Figure 12:
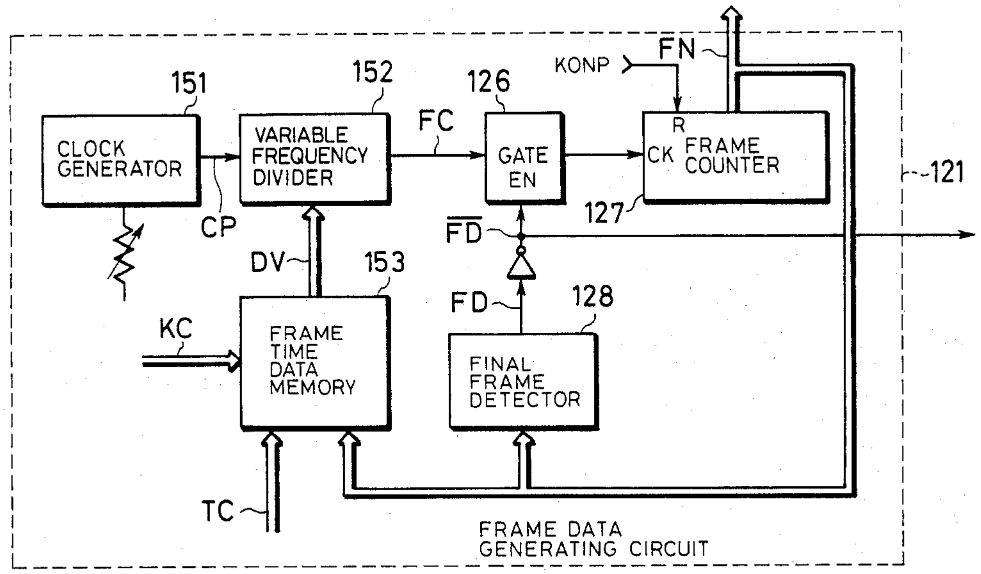
FIGS. 12 and 13 are partial block diagrams showing modifications of the embodiment of FIG. 10.

FIG. 12 shows another embodiment of the present invention and particularly a construction replacing the frame data generating circuit 121 in FIG. 10. Whereas the frame data generating circuit 121 in FIG. 10 is to detect the timing of switching each frame on the basis of the elementary tone wave repetition number, in the case of FIG. 12, whenever the present time elapses, the frame will be switched.

In FIG. 12 showing the parts corresponding respectively to the same parts in FIG. 10 by attaching the same reference numerals to them, the oscillation output CP of the clock generator 151 is divided in the variable frequency divider 152 and is then given as a clock signal to the frame counter 127 through the gate 126. The variable frequency divider 152 can change and control the division factor to the oscillation output CP by the division value data DV given from the frame time data memory 153.

The variable frequency divider 152 is constructed, for example, of a counter, is loaded with the division value data DV as present data and to the gate 126 the pulse output consisting of the carry signal of this counter as the frame count output FC.

The frame time data memory 153 has stored for each tone color and for each key the division value data corresponding respectively to the 0th to (N−1)th frames 0F to (N−1)F. Therefore, when the division value data DV designated by the tone color selecting signal TC, the key code signal KC corresponding to the depressed key and the frame designating signal FN from the frame counter 127 are supplied to the variable divider 152, the frame count output FC generated at the time intervals corresponding to each of the 0th to (N−1)th frames described above on FIG. 1 will be able to be obtained at the output end of the variable frequency divider 152.

In the construction in FIG. 12, when the division value data corresponding to the selected tone color and the pitch of the depressed key are selected by the tone color selecting signal TC and key code signal KC, the division value data corresponding to the frame designating data FN from among these selected division value data will be read out of the frame time data memory 153 and will be supplied to the variable frequency divider 152. Therefore, the frame count output FC will be supplied from the variable divider 152 at the time intervals corresponding to the value of the division value data DV and will be given to the frame counter 127 through the gate 126.

Thus, whenever the frame count output FC is supplied, the frame counter 127 will operate to count "1" so that the contents of the frame designating data FN given to the frame time data memory 153 will rise by "1". Thereby, the value of the division value data DV will be changed whenever the frame shifts. Thus, the pulse intervals of the frame count output FC will be changed with each frame.

Therefore, according to the construction in FIG. 12, as the repetition number of the elementary tone wave in each frame described above on FIG. 10 is set as the frame time data in the frame time data memory 153, the same frame designating data FN as in the frame data generating circuit 121 in FIG. 10 can be generated.

Embodiment 5

Figure 13:
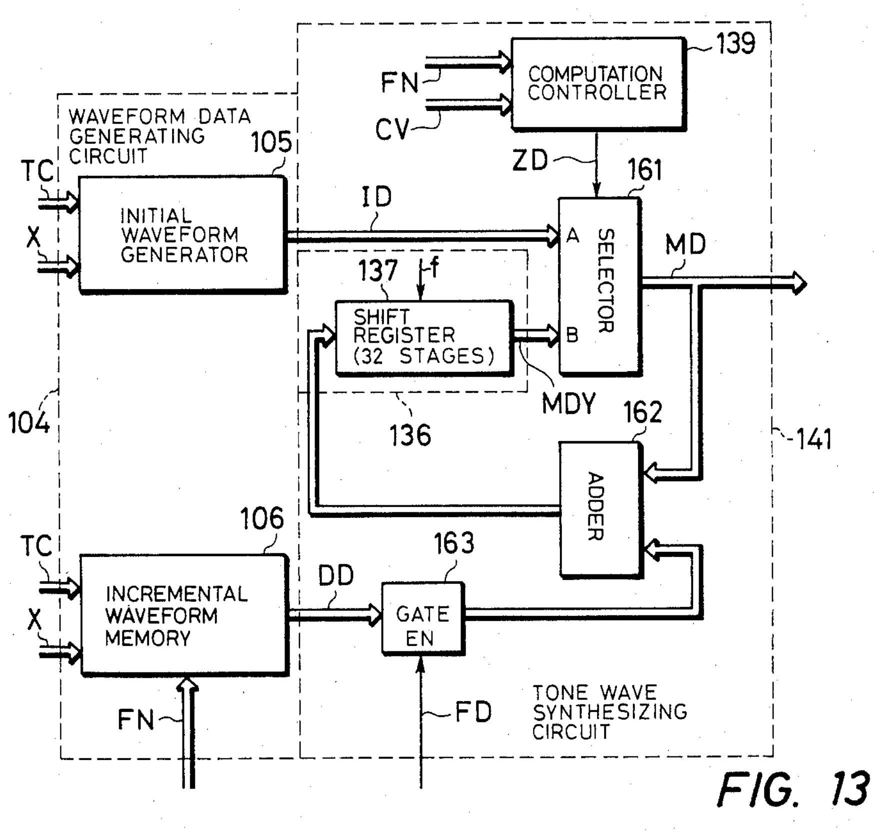

FIG. 13 shows further another embodiment of the present invention. The construction in FIG. 13 can be applied as the tone wave synthesizing circuit 141 forming the tone wave data MD on the basis of the output data ID and DD of the initial waveform generator 105 and incremental waveform memory 106 in FIG. 10.

In the case of FIG. 13, as shown by attaching the same reference numerals to the parts corresponding to those in FIG. 10, the initial waveform data ID of the initial waveform generator 105 are inputted to the first input terminal A of the selection 161 and the computation controller 139 makes the selector 161 select the initial waveform data ID with the control output ZD rising to logic "1" when the frame designating data FN is "0" and the computation sequence data CV is "0", and supply them as the tone wave data MD.

These tone wave data MD are supplied to the multiplier 135 (FIG. 10) and, at the same time, are given to the adder 162. The incremental waveform data DD from the incremental waveform memory 106 are given to the adder 162 through the gate 163 and are added to the tone wave data MD.

Here, the inversion detection output $\overline{FD}$ from the inverter 129 (FIG. 10) is given as an enable signal directly to the gate 163. Thus, when the frame is not the final frame NF, the incremental waveform data DD of the incremental waveform memory 106 will be given to the adder 162 and will be added to the tone wave data MD now being supplied from the selector 161.

Therefore, the addition result obtained at the output end of the adder 162 will be new tone wave data obtained by adding the incremental waveform data DD to the present tone wave data MD and these new tone wave data will be stored in the shift register 137 of 32 stages. Thus, the new tone wave data MDY from the shift register 137 will be given to the other input terminal B, will be selected when the control output ZD is logic "0" and will be supplied as the tone wave data MD.

In the construction in FIG. 13, when the first tone wave data of the 0th frame 0F are generated, the computation controller 139 will supply the control output ZD of the logic "1" so that the selector 161 will select the initial waveform data ID of the initial waveform generator 105 and will supply them as the tone wave data MD.

At the same time, the incremental waveform data DD of the 0th frame 0F will be supplied from the incremental waveform memory 106 and will be added to the tone wave data MD in the adder 162. Therefore, the data (which are the tone wave data MD to be generated in the next tone wave period) obtained by adding the incremental waveform data DD to the tone wave data MD now generated on the basis of the initial waveform data ID at the output end of the adder 162, are stored as new tone wave data in the shift register 137.

When the generation of the first tone wave data ends, the value of the computation sequence data CV will be turned to "1", thereby the control output ZD will fall to the logic "0" and, correspondingly, the selector 161 will select the output MDY of the shift register 137 and will supply it. The tone wave data MD supplied at this time will be the new tone wave data MDY already taken in the preceding tone wave period in the shift register 137. Therefore, the tone wave data MD will have contents changed by the part of the incremental waveform data DD, will be supplied to the multiplier 135 (FIG. 10) and will be inputted to the adder 162.

Thereafter, by repeating the above described operation, when the tone wave to be generated in the period of the next tone wave following the now generated tone wave is stored progressively previously in the shift register 137, the same tone wave data as the tone wave data obtained on FIG. 10 will be able to be obtained.

Modifications (1) In the embodiments 3 to 5, the waveform data of the values obtained by dividing the increments between the first tone waves of the adjacent two frames by the repetition number are stored in the incremental waveform memory 106 but various waveform change data can be used. For example, the incremental waveform data of the values obtained by dividing the increments between the first tone waves and last tone waves of the respective frames by the repetition number may be stored.

(2) In the constructions in FIGS. 10 and 13, the shift register 137 is used as the storage element in the tone wave data memory circuit 136 but, alternatively, such memory as an RAM, etc. may be used.

(3) In the embodiments 3 to 5, the elementary tone wave period is not limited to be one cycle but may be ½ cycle, ¼ cycle or a plural of cycles (for example, two cycles).

For example, in case the elementary tone wave period is made ½ cycle and the initial waveform data for ½ cycle are stored in the initial waveform generator 105, the positive and negative polarities may be alternately given to the ½ cycle waveform read out to obtain one cycle waveform.

In case the elementary tone wave period is made two cycles, the phase counter 103 in FIG. 10 may be so constructed as to supply such phase address signal X as addresses respective sampling points for the two cycles and to supply the carry signal whenever addressing the respective sampling points for the two cycles makes one round. Further, in such case, the repetition number data TCV may be data representing the number for 2 cycles, the incremental waveform data to be stored in the incremental waveform memory 106 in FIG. 10 may be for 2 cycles and further the shift register 137 in FIG. 10 may be also set to be of the number of stages corresponding to the sampling points for 2 cycles.

(4) In the embodiments 3 to 5, the waveform memorizing system for the waveform memory used as the initial waveform generator 105 and the incremental waveform memory 106 is not limited to be a PCM but such waveform encoding system as a DPCM, DM, APCM, ADPCM or AD may be used.

(5) In the case of the embodiments 3 to 5, the waveform memory is used as the initial waveform generator 105 but, alternatively, such various waveform generating methods as generating the waveform by computation may be used as required.

(6) In the case of the embodiments 3 to 5, the present invention is described as applied to a monophonic electronic musical instrument but can be applied also to a polyphonic electronic musical instrument by a channel assigning system. In such case, there can be used a construction wherein each circuit block is operated in time division for a plural of tone production channels or each circuit block is provided in parallel with each tone production channel.

(7) In the embodiments 3 to 5, the present invention is described as applied to the electronic musical instrument synthesizing a tone wave corresponding to the musical scale tones but is not limited to it and can be applied in the same manner also to a tone wave synthesizing apparatus made to synthesize rhythm tones (particularly not rhythm tones to the noise series but rhythm tones having such periodic waveforms as of a drum).

(8) In the embodiments 3 to 5, for the tone wave MW (FIG. 1) to be synthesized, the frames 0F to NF may be sectioned to be of uniform or non-uniform lengths over all. For example, if such part in which the tone wave MW changes complicatedly as the tone wave rising part (attacking part) is divided into many frames at comparatively short intervals, a tone wave approximating to the natural musical instrument sound will be able to be reasonably synthesized.

(12) In the case of the embodiments 3 to 5, the tone wave is to be synthesized by applying the present invention to the entire range from the beginning to the end of sounding the tone wave MW as described above on FIG. 1 but, alternatively, only a part of the tone wave may be synthesized. For example, whereas, in the attacking part in which the tone wave changes comparatively complicatedly, a plural of continuous periodic waveforms (having the waveforms of the natural musical instrument sounds) are stored as they are in the waveform memory by the conventional method, in the waveform part in which the changes are comparatively few after the attacking part, the tone waves may be synthesized on the basis of the present invention.

What is claimed is:

1. A tone wave synthesizing apparatus comprising:

phase addressing means for generating a phase address signal which designates phase addresses progressively and repetitively;

time frame designating means for sequentially designating, for each tone wave to be synthesized, a series of time frames one after another, each time frame being of duration longer than a single period of the tone wave to be synthesized;

elementary wave generating means for repeatedly generating, for each designated time frame, a period of elementary tone wave in the form of a series of wave sample values in accordance with said phase address signal, said elementary tone wave representing a tone wave at a beginning of the designated time frame;

incremental wave generating means for generating progressively changing incremental waves each in the form of a series of wave sample values in accordance with said phase address signal, said progressively changing incremental waves exhibiting successive changes of waveform from one period to another period by an amount predetermined for each designated time frame; and wave combining means for combining, in each time frame of said successive time frames, said elementary tone wave and said progressively changing incremental waves.

2. A tone wave synthesizing apparatus according to claim 1, wherein said elementary wave generating means includes;

a basic wave memory storing a period of basic waveform which is determined as a waveform common over all of the tone waves to be produced, and a difference wave memory storing difference waveforms each of which is determined as a wave difference between the elementary tone wave to be generated for the each time frame and said basic waveform, and said elementary wave generating means generates, for each designated time frame, a period of elementary tone wave by combining said basic waveform and said each difference waveform; and wherein, said incremental wave generating means generates, for each designated time frame, progressively changing incremental waves by making an interpolating computation between the difference waveform for said each designated time frame and the difference waveform for the next time frame by the multiplication of a difference between the two difference waveforms and a coefficient which progressively varies from 0 to 1 for one period to another.

3. A tone wave synthesizing appartus according to claim 1, wherein said elementary wave generating means includes;

an initial wave memory storing a period of initial waveform which is determined as a wave representing the elementary tone wave for the first time frame, and a difference wave memory storing difference waveforms each of which is determined as a wave difference between the elementary tone waves to be generated for the each time frame and for the next time frame, and said elementary wave generating means generates, for each designated time frame, a period of elementary tone wave by combining the initial waveform and an accumulation of the difference waveforms up to the designated time frame; and wherein, said incremental wave generating means generates, for each designated time frame, progressively changing incremental waves by multiplying the difference waveform for the each designated time frame and a coefficient which progressively varies from 0 to 1 for one period to another.

4. A tone wave synthesizing apparatus according to claim 1, wherein;

said incremental wave generating means includes an incremental wave memory storing incremental waveforms each of which is determined as a wave change from one period to another in the each time frame, and said incremental wave generating means generates progressively changing incremental waves by accumulating said incremental waveform of said designated time frame; and wherein, said elementary wave generating means includes an initial wave memory storing a period of initial waveform which is determined as a wave representing the elementary tone wave for the first time frame, and said elementary wave generating means generates, for each designated time frame, a period of elementary tone wave by combining the initial waveform and an accumulation of said incremental waveforms up to the designated time frame.

5. A system for generating a musical tone comprising:

time frame designating means for designating a series of time frames extending over substantially the entire sounding of said musical tone, each time frame having a duration in which plural periods of said musical tone are generated, elementary waveshape establishing means for establishing a set of tone waveforms each representing the waveshape of the musical tone being generated respectively at the start of each time frame in said series, waveshape incremental change means, operative during successive periods of musical tone generation in each time frame, for producing during each time frame a succession of incrementally changing waveshapes which vary between the waveshape established for the start of that frame and the waveshape established for the start of the next time frame, and musical tone production means for producing said generated musical tone utilizing said succession of incrementally changing waveshapes.

* * * * *

UNITED STATES PATENT AND TRADEMARK OFFICE

CERTIFICATE OF CORRECTION

PATENT NO. : 4,611,522

DATED : September 16, 1986

INVENTOR(S) : Hideo Suzuki

It is certified that error appears in the above-identified patent and that said Letters Patent is hereby corrected as shown below:

On the title page, Item /75/

Inventor's name should read "Hideo Suzuki".

Signed and Sealed this

Sixteenth Day of December, 1986

*Attest:*

DONALD J. QUIGG

*Attesting Officer* *Commissioner of Patents and Trademarks*